United States Patent
Van Den Goor

(10) Patent No.: US 8,424,670 B2
(45) Date of Patent: Apr. 23, 2013

(54) SORTING DEVICE IN PARTICULAR FOR PIECES OF LUGGAGE

(75) Inventor: Marie Jacobus Van Den Goor, Nuenen (NL)

(73) Assignee: Vanderlande Industries B.V., Veghel (NL)

( * ) Notice: Subject to any disclaimer, the term of this patent is extended or adjusted under 35 U.S.C. 154(b) by 211 days.

(21) Appl. No.: 12/863,862

(22) PCT Filed: Jan. 20, 2009

(86) PCT No.: PCT/NL2009/000008
§ 371 (c)(1),
(2), (4) Date: Sep. 1, 2010

(87) PCT Pub. No.: WO2009/093894
PCT Pub. Date: Jul. 30, 2009

(65) Prior Publication Data
US 2010/0320062 A1    Dec. 23, 2010

(30) Foreign Application Priority Data
Jan. 22, 2008    (NL) ..................................... 1034940

(51) Int. Cl.
B65G 47/44    (2006.01)

(52) U.S. Cl.
USPC ...................................... 198/370.02; 198/890

(58) Field of Classification Search .................. 198/890, 198/890.1, 370.02, 370.07
See application file for complete search history.

(56) References Cited

U.S. PATENT DOCUMENTS

| | | | | |
|---|---|---|---|---|
| 3,333,675 | A * | 8/1967 | Lord ......................... | 198/370.02 |
| 4,732,260 | A * | 3/1988 | Canziani ................... | 198/370.02 |
| 5,435,429 | A * | 7/1995 | Van Den Goor ........... | 198/890.1 |
| 5,826,695 | A * | 10/1998 | Van Den Goor ......... | 198/370.02 |
| 5,921,378 | A * | 7/1999 | Bonnet ......................... | 198/850 |
| 5,950,798 | A * | 9/1999 | Bonnet .................... | 198/370.02 |
| 6,543,602 | B1 * | 4/2003 | Bonnet .................... | 198/370.03 |
| 6,698,571 | B2 * | 3/2004 | Bonnet .................... | 198/370.02 |
| 6,705,452 | B2 * | 3/2004 | Greve et al. ............. | 198/370.02 |
| 6,802,412 | B2 * | 10/2004 | Lapeyre et al. .......... | 198/370.02 |
| 6,974,019 | B2 * | 12/2005 | Lapeyre et al. .......... | 198/370.02 |
| 7,261,198 | B2 * | 8/2007 | Tatar et al. ............... | 198/370.02 |
| 7,284,652 | B2 * | 10/2007 | Zeitler et al. ............. | 198/370.02 |
| 2010/0059333 | A1 * | 3/2010 | Van Den Goor et al. | 198/370.02 |
| 2011/0108388 | A1 * | 5/2011 | Van Den Goor et al. | 198/370.02 |

FOREIGN PATENT DOCUMENTS

| | | |
|---|---|---|
| EP | 0 960 838 | 12/1999 |
| EP | 0990604 A1 | 4/2000 |
| EP | 1 422 173 | 5/2004 |
| EP | 1 972 579 | 9/2008 |
| WO | 98/31614 | 7/1998 |

* cited by examiner

*Primary Examiner* — Gene Crawford
*Assistant Examiner* — Keith R Campbell
(74) *Attorney, Agent, or Firm* — Barnes & Thornburg LLP

(57) ABSTRACT

A sorting device for sorting products, such as pieces of luggage. The sorting device includes one or more sorting units which are movable in a conveying direction along a conveying path. Each sorting unit may include a carrier for supporting a product to be sorted, an elongated pusher element disposed above an associated carrier, moving means for moving a pusher element sideways with respect to the associated carrier at a sorting location, and guide means for guiding the sideways movement of the pusher element. The guide means may include at least one guide, which is fixedly disposed relative to the associated carrier, and at least one guide member, which is movable along the at least one fixed guide. The guide member may be connected to the pusher element.

17 Claims, 14 Drawing Sheets

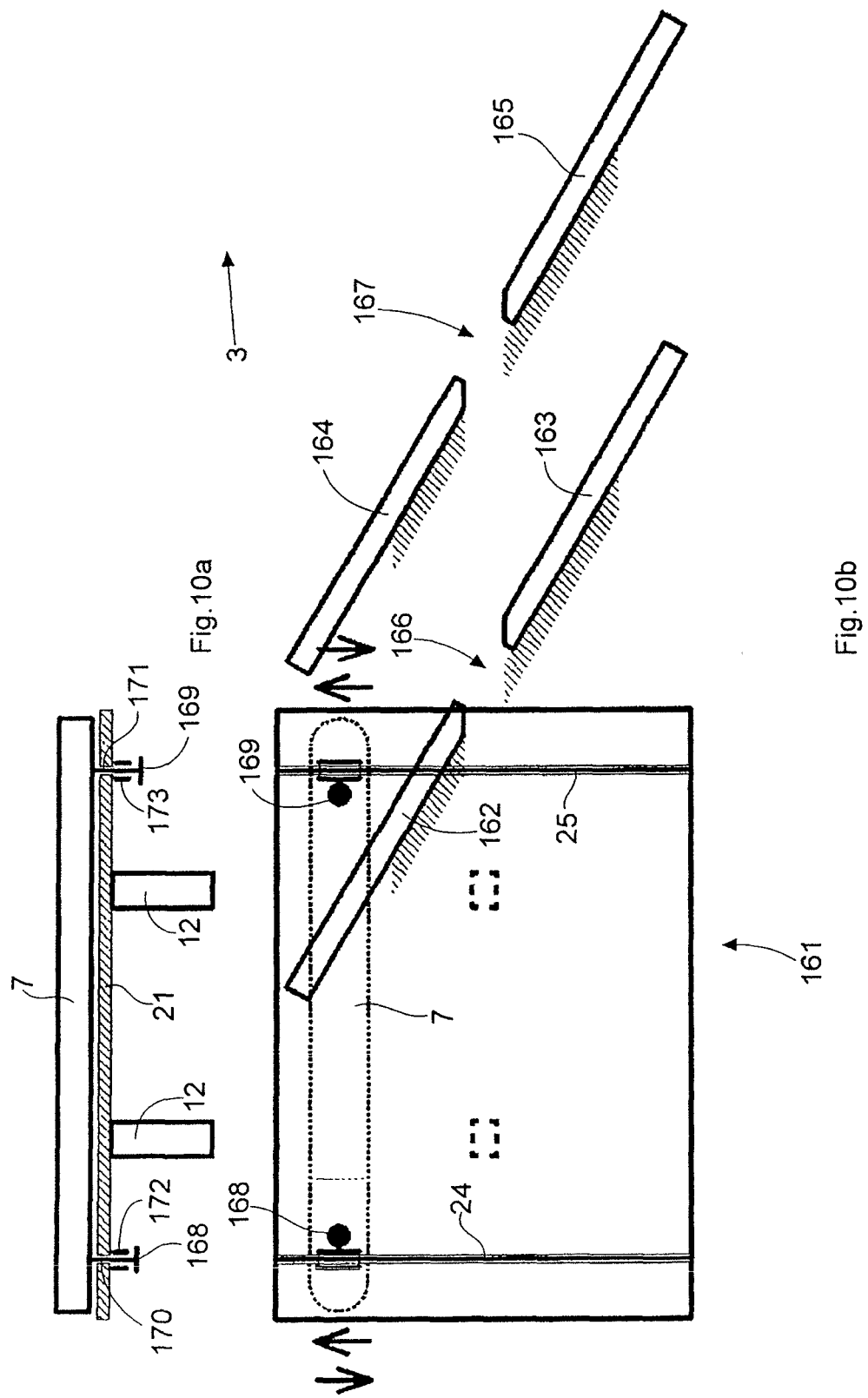

SORTING DEVICE IN PARTICULAR FOR PIECES OF LUGGAGE

This Application is a national stage of the International Patent Application No. PCT/NL2009/000008 filed on Jan. 20, 2009. Priority is claimed to Netherlands Application No. 1034940, filed on Jan. 22, 2008, and the contents of which International and Dutch Applications are incorporated herein by reference in the this Application.

BACKGROUND SUMMARY

The present disclosure relates to a sorting device for sorting products, such as, for example, pieces of luggage. The sorting device includes a number of sorting units which are movable in a conveying direction along a conveying path. Each sorting unit includes a carrier for supporting a product to be sorted, an elongated pusher element disposed above an associated carrier, moving means for moving a pusher element sideways with respect to the associated carrier at a sorting location, and guide means for guiding the sideways movement of the pusher element. The guide means includes at least one guide, which is fixedly disposed relative to the associated carrier, and at least one guide member, which is movable along the at least one fixed guide, and which guide member is connected to the pusher element. The moving means includes at least one driving motor for each sorting unit for effecting the sideways movement of the pusher element relative to the associated carrier.

Such a sorting device is marketed by Vanderlande Industries Nederland BV under the name of Baxorter. In the sorting device, the sideways movement of an elongated pusher element is realized in that a guide which is oriented at an angle relative to the conveying direction is locally provided, for example, at a sorting location where products are to be moved off the carrier by the pusher element. Guide wheels can run along the guide, which guide wheels are connected to the pusher element. The known sorting device is suitable for sorting pieces of luggage at a sorting capacity of 1500-3000 items per hour.

The present disclosure provides for a sorting device which is suitable for use with higher capacities. In the prior art, so-called "tilt tray" sorting devices are used for these capacities, which sorting devices do not make use of an elongated pusher element by which products are pushed off a carrier. Rather, they use a carrier which can tilt about a tilting axis extending parallel to the conveying direction, so that the products will move off the carrier under the influence of the force of gravity upon tilting of the carrier. An example of such a tilt tray sorting device is described in European patent application EP 960 838 A1.

An embodiment, according to the present disclosure, comprises a moving means that includes two driving motors for each sorting unit for effecting the sideways movement of the pusher element relative to the associated carrier. In this way, the sideways movement of the pusher element can be effected in a very reliable manner using a relatively simple construction, in spite of the use of an "additional" driving motor for each sorting unit.

A very stable guidance of the pusher element is obtained if the guide means includes two fixed guides and two guide members which are movable along the fixed guides.

If, according to the embodiment as discussed in the foregoing, two driving motors are used, it is very advantageous if the two driving motors move the pusher element sideways via the two guide members, since it is not necessary in that case to effect a separate connection apart from the guide members between the driving motors on the one hand and the pusher element on the other hand. That might make it necessary to provide additional interruptions in the carrier, which in turn might lead to the products to be sorted on the carrier catching thereon.

The mechanical load on the pusher element is reduced if the two fixed guides are provided near two opposite ends of the elongated pusher element.

According to another embodiment, according to the present disclosure, the two guide members are pivotally connected, about respective vertical axes, to the pusher elements. As a result, the pusher element can be oriented not only parallel to the conveying direction but also at an angle relative to the conveying direction during the sideways movement of the elongated pusher element.

Within the framework of the above-noted embodiments it is desirable if the pusher element has a variable length, in which case it is assumed that the two fixed guides are oriented parallel to each other.

The moving means may comprise mechanical transmission means which act between the at least one driving motor and the pusher element.

More specifically, it is desirable if the mechanical transmission means act between the at least one driving motor and the at least one guide member, so that there is no need to effect a connection between the transmission means and the pusher element parallel to the at least one guide member.

According to another embodiment, according to the present disclosure, the transmission means includes at least one meshing rack-and-pinion combination, the rack being fixedly connected to the associated carrier and the pinion having a central axis. For reasons of constructional simplicity, the at least one rack may extend parallel to the at least one fixed guide and/or wherein an outgoing shaft of the at least one driving motor is in line with the central axis of the at least one pinion.

Alternatively, or in combination with the first-noted embodiment, in which the transmission means includes at least one meshing rack-and-pinion combination, the transmission means includes a flexible transmission element which is passed over at least two pulley means which are fixedly connected to the carrier, which pulley means each have a central axis.

One flexible transmission element may be advantageously connected to the pusher element via two guide members, so that, in principle, one driving motor for each sorting unit will suffice.

In combination with the use of transmission means including at least one meshing rack-and-pinion combination, further embodiments, according to the present disclosure, may be comprised such that the transmission means includes two meshing rack-and-pinion combinations, and in that the two pulley means are connected to the two pinions for joint rotation. And for reasons of constructional simplicity, the central axes of the two pulley means coincide with the central axes of the two pinions and/or the teeth of the two racks face towards or away from each other.

Another embodiment according to the present disclosure is provided wherein the transmission means includes a spindle-spindle nut combination.

To prevent the products to be sorted from being moved off the carrier undesirably while travelling through bends in the conveying path, it is desirable if the carrier is concave, seen in vertical section transversely to the conveying direction.

Advantageously, the at least one driving motor is fixedly connected to the carrier, so that there will be no occurrence of mass inertia forces that load the sorting device as a result of a relative movement between the at least one driving motor and the carrier.

Another embodiment of a sorting device according to the present disclosure is comprised such that the at least one driving motor is a linear induction motor (LIM). The moving means further includes a reaction member for driving cooperation with the LIM driving motor. The use of a LIM driving motor leads to a reduction of the required number of moving parts, in particular if, according to another embodiment of the present disclosure, the reaction member is connected to the pusher element.

When pieces of luggage are to be handled it is desirable if each sorting unit comprises a mobile chassis for supporting the carrier.

Advantageously, the sorting units are pivotally interconnected about a vertical pivot axis, possibly via a chassis thereof. This enables the sorting units to travel conveying paths that extend in the horizontal plane, so that the entire length of the conveying path can be utilized for sorting products along the path. In addition, if an endless conveying path is used, products can remain present on a sorting unit longer, for example, in case of a temporary malfunction at a sorting location.

A maximum capacity can be achieved if, according to another embodiment of the present disclosure, the sorting units jointly form an endless train.

Depending on the field of application, it may be advantageous if the sorting units are detached from each other, so that a higher degree of flexibility can be obtained.

Another embodiment, according to the present disclosure, may be comprised such that the sorting device includes a first conveyor for conveying the sorting units. The first conveyor may include a supporting surface moving in the conveying direction, which functions to support the sorting units.

Advantages of the use of sorting units which are detached from each other become manifest, in particular, if the sorting device includes a second conveyor connecting to the first conveyor. Thus, the sorting units can be transferred from the first conveyor to the second conveyor. In this way it is quite possible for the conveying path to comprise right-angled bends, for example.

According to another embodiment, according to the present disclosure, the second conveyor branches off from the first conveyor, so that flexibility is also obtained as regards the conveying path being travelled. That is, from the branching point via the first conveyor or via the second conveyor.

The sorting device may include transfer means at the location of the branching point for selectively transferring a sorting unit from the first conveyor to the second conveyor, so that the sorting process can take place in a highly automated manner.

Advantages of the embodiments of the present disclosure come into play when sorting relatively voluminous products, such as pieces of luggage or parcels, for example. Within this framework it is desirable if the pusher element has a length of at least 50 cm, or, for example, at least 80 cm.

The use of an LIM driving motor, as already discussed before, may be advantageous not only if the LIM driving motor forms part of a sorting device and thus moves along with the sorting device, but also if the LIM driving motor is disposed beside the path of the sorting device. Within this framework, another aspect according to the present disclosure, relates to a sorting device for sorting products, such as pieces of luggage. Such a device may include a number of successive sorting units which are movable in a conveying direction along a conveying path. Each sorting unit includes a carrier for supporting a product to be sorted, an elongated pusher element disposed above an associated carrier, moving means for moving a pusher element sideways with respect to the associated carrier at a sorting location, and guide means for guiding the sideways movement of the pusher element. The guide means includes at least one guide, which is fixedly disposed relative to the associated carrier, and at least one guide member, which is movable along the at least one fixed guide. The guide member is connected to the pusher element. The moving means includes at least one linear induction (LIM) driving motor disposed at the sorting location for each sorting unit, as well as a reaction member associated with a sorting unit for driving cooperation with the at least one LIM driving motor upon passage of the sorting location by the sorting unit in question for effecting the sideways movement of the pusher element relative to the associated carrier. In this way a possibility, according to the present disclosure, is provided to use a light and constructionally very simple design for each sorting unit.

The at least one LIM driving motor may be oriented at an angle relative to the conveying direction, in which case the reaction member follows the inclined orientation of the LIM driving motor, as it were, when the sorting unit with which the reaction member is associated passes the LIM driving motor.

Considering the fact that it is desirable to provide the reaction member close to the pusher element and to dispose the at least one LIM driving motor close to the path of the reaction member, it is desirable if two aligned LIM driving motors arranged in spaced relationship are provided, in which case part of the sorting unit can pass between the two LIM driving motors, so that part of the sorting unit can also extend below the LIM driving motors.

To make it possible to move the pusher element sideways in a stable manner, with the pusher element being oriented parallel to the conveying direction, as seen in the longitudinal direction thereof, it is desirable if two LIM driving motors arranged in parallel relationship are provided for simultaneous driving cooperation with two reaction members associated with a sorting unit.

Thus, it is no longer necessary to use a transmission between the at least one reaction member and the pusher element if at least one reaction member is directly connected to a pusher element for joint movement. This may have a positive effect as regards the constructional simplicity.

On the other hand, it may also be advantageous if at least one reaction member is connected to the pusher element via a transmission, in particular if the transmission has a transmission ratio other than 1:1. Thus, the at least one reaction member need not move at least substantially across the entire width of the carrier for moving the pusher element across the entire width of the carrier. The remaining part of the width of the carrier may be utilized for the passage of part of the sorting unit at that location.

Other aspects of the present disclosure will become apparent from the following descriptions when considered in conjunction with the accompanying.

BRIEF DESCRIPTION OF THE DRAWINGS

FIGS. 10a and 10b schematically show a side view and a top plan view, respectively, of a portion of a sorting unit forming part of a sorting device of an eighth embodiment, according to the present disclosure.

DETAILED DESCRIPTION

In the description of the Figures below, like parts of the various embodiments according to the present disclosure are indicated by corresponding numerals.

Figure 1:
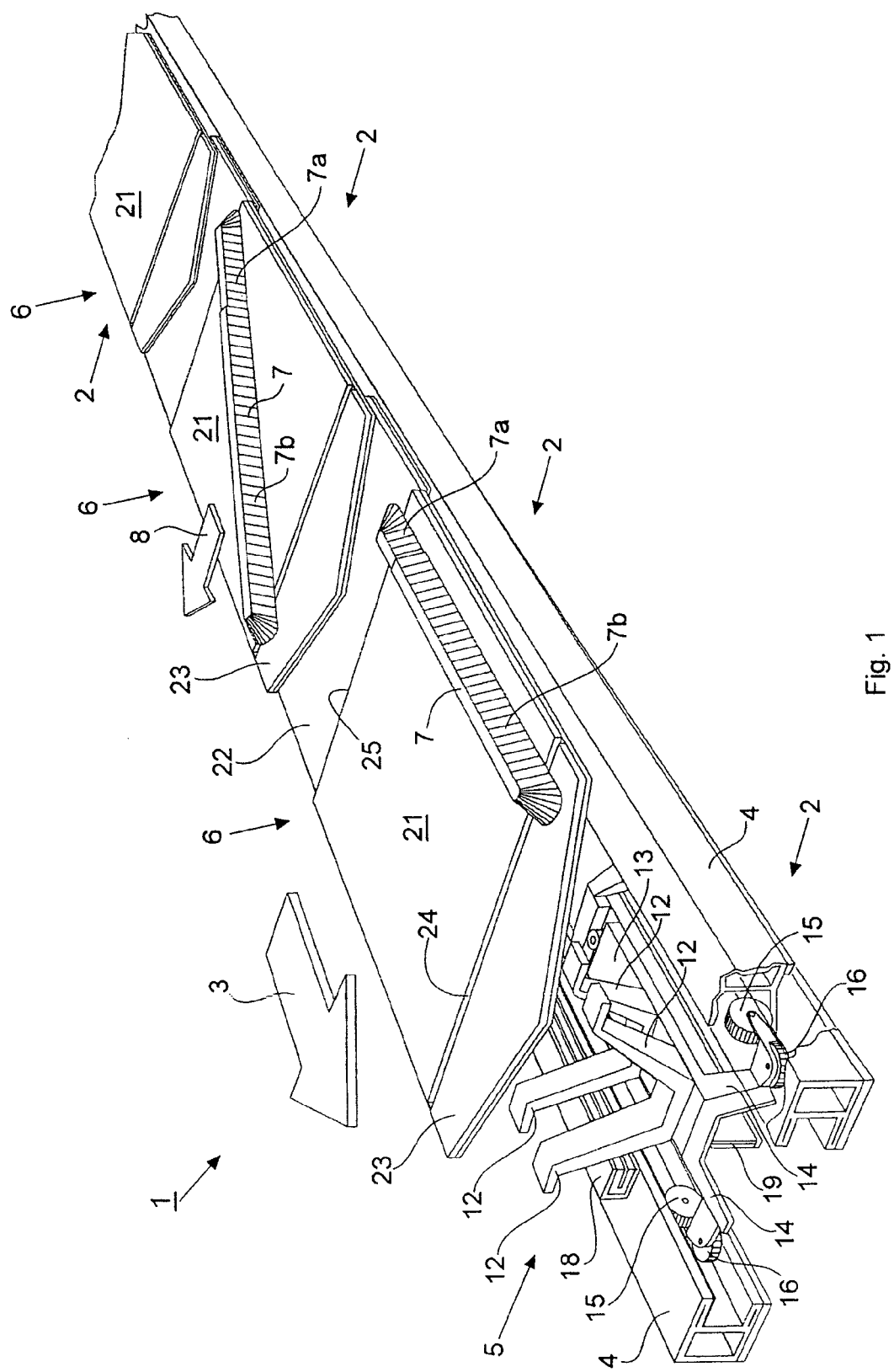
FIG. 1 is a schematic perspective view of part of a sorting device, according to the present disclosure.

FIG. 1 shows part of a sorting device 1 comprising a plurality of successive sorting units 2, which are movable in conveying direction 3 along an endless conveying path which is defined by the course of guides 4. Each sorting unit 2 comprises a chassis 5 and a carrier 6 supported by the chassis 5 with an associated elongated pusher element 7 and means (not shown in FIG. 1) for moving the associated pusher element 7 in a direction transversely to the conveying direction indicated by the arrow 8 relative to the associated carrier 6. The carrier 6 for the front sorting unit 2 is not shown in FIG. 1 for the sake of clarity. In FIG. 1, the length of chassis 5 is shown proportionally too short, since the chassis 5 has at least substantially the same dimensions, seen in the conveying direction 3, as another sorting unit 2, so that one chassis 5 is provided under each carrier 6.

Figure 2:
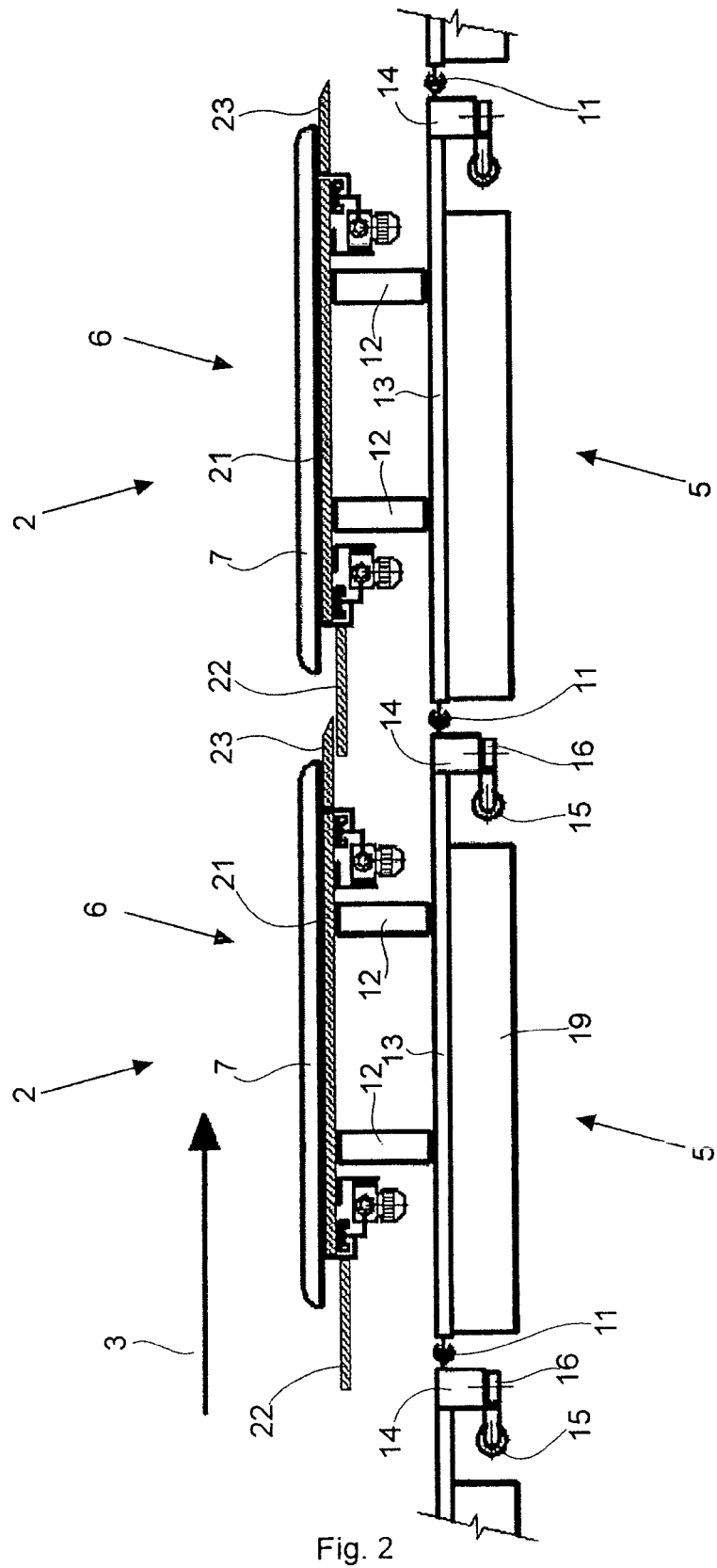
FIG. 2 is a schematic side view of two successive sorting units forming part of a sorting device of a first embodiment, according to the present disclosure.
Figure 3A:
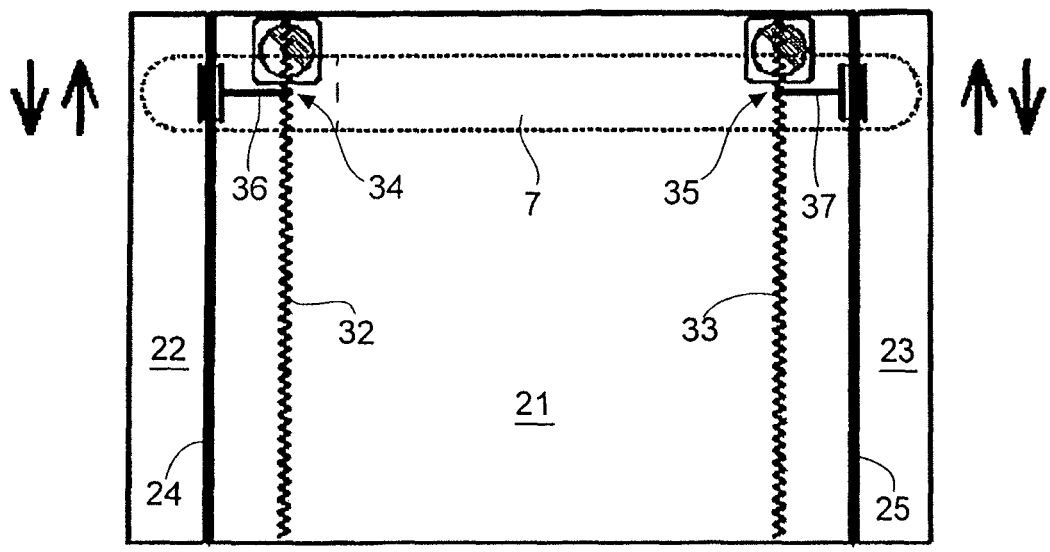
FIGS. 3a-3c schematically show a top plan view, a side view and a front view, respectively, of a portion of the sorting unit of FIG. 2.
Figure 3B:
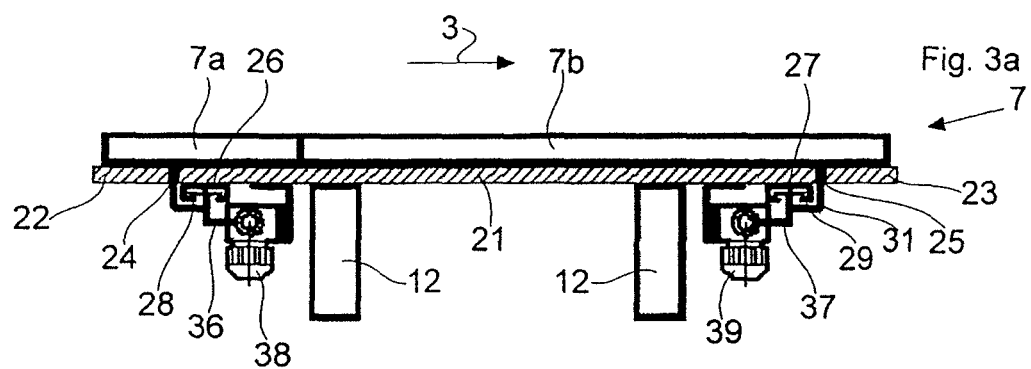
Figure 3C:
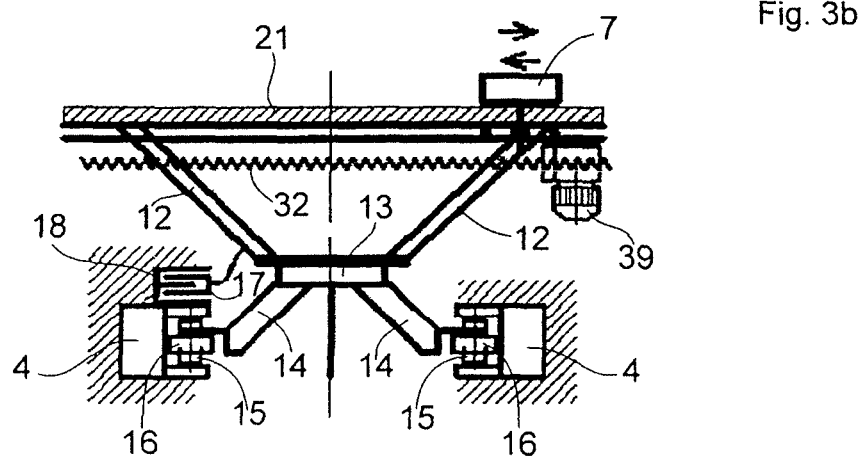

Now also referring to FIGS. 2, 3b and 3c, first a more detailed description of the chassis 5 will be given. The chassis 5, associated with successive sorting units 2, is pivotally interconnected about vertical pivot axes by couplings 11, thus forming an endless train. Each chassis 5 comprises four support arms 12, which are arranged in V-shaped pairs and which each support the carrier 6 at their upper ends. The lower ends of the support arms 12 rest on a plate-shaped connecting member 13. At the front side of each chassis 5, two wheel legs 14 sloping downwards from the connecting member 13 are provided. For each wheel leg 14, a running wheel 15, being rotatable about a horizontal axis, and a guide wheel 16, being rotatable about a vertical axis, are provided at the lower ends thereof. The wheels 15, 16 run inside the guides 4, which are to that end U-shaped, with the open sides of the U-shape of the opposite guides 4 facing each other.

The chassis 5 further comprises a horizontal, U-shaped pick-up element 17, which is connected to one of the support arms 12 and whose legs extend between the legs of a horizontal, M-shaped fixed conductor rail 18, which is provided above one of the guides 4. The pick-up element 17 and the conductor rail 18 make it possible to realize a contactless transfer of electrical energy by inductive power transfer (IPT). The energy can be used for actuating electric motors associated with a sorting unit, which function to effect the transverse movement of the pusher element 7. Alternatively, it would also be possible, according to the present disclosure, to use a contacting transfer of electrical energy, in which case use could be made of current brushes connected to the chassis 5, which extend along a fixed conductor rail.

At its bottom side, the chassis 5 is furthermore centrally provided with a downwardly oriented reaction plate 19, which co-acts with LIM motors (not shown) disposed in spaced relationship along the path of the of the reaction plates 19. A chassis which is largely comparable to the chassis 5, as described above, is known from EP-A1-990604.

The chassis 5, as described above, is identical to the chassis described with reference to the embodiments described below, with the exception of the eighth embodiment of a sorting device as shown in FIGS. 10a and 10b, which does not comprise a driving motor for the respective sorting unit. Thus, there is no need for electrical energy transfer, using IPT technology, by the pick-up element 17 and the conductor rail 18.

Each carrier 6 comprises a rectangular carrier blade 21 intended for supporting products to be sorted, such as pieces of luggage. A typical dimension of the carrier blade 21, seen in the conveying direction 3, is at least 60 cm. Closing blades 23, 22 are provided at the front and rear sides, respectively, of the carrier blades 21, which closing blades overlap between the carrier blades 21 of two successive sorting units 2. The overlap is clearly shown in FIG. 2. On account of the schematic nature of FIGS. 3b-9b, the closing blades 22, 23 are shown at the same vertical level in the Figures, which is not the case in actual fact. The carrier blades 21 and the overlapping closing blades 22, 23 form, at least substantially, a closed surface.

The elongated pusher element 7 is of the telescopic type. The pusher element portion 7a is capable of moving into and out of the pusher element portion 7b. Present between the carrier blade 21, on the one hand, and the closing blades 22, 23, on the other hand, is a gap 24, 25 extending transversely to the conveying direction 3. The ends of the pusher element 7 extend above the gaps 24, 25. At the location of each of the ends, each pusher element 7 associated with a sorting unit 2 is connected to moving means via the gaps 24, 25 for moving a pusher element 7 sideways, as indicated by the arrow 8, at a sorting location, where a chute or a discharge conveyor may be provided, for example.

Each carrier 6 further comprises two fixed guides 26, 27, which extend parallel to and in the immediate vicinity of the gaps 24, 25, and which are fixedly connected to the bottom side of the carrier blade 21. Guide members 28, 29, for example, configured as guide rollers or sliding shoes, extend within the guides 26, 27.

The various embodiments of sorting devices, according to the present disclosure, discussed below are different from each other mainly as regards the aforesaid moving means.

The carrier 6 further comprises two spindles 32, 33 extending parallel to the guides 26, 27. Spindle nuts are provided at the locations indicated by numerals 34, 35, which spindle nuts can mate with spindles 32, 33. The spindle nuts 34, 35 are connected, via connecting pieces 36, 37, to guide members 28, 29, respectively, which are in turn connected, via connecting pieces 30, 31, to the pusher element 7, and more specifically to the pusher element portion 7a and the pusher element portion 7b, respectively, at the ends of the pusher element 7. The carrier 6 further comprises an electric driving motor 38, 39 for each spindle 32, 33, by which the spindles 32, 33 can be set rotating, as a result of which the spindle nuts 34, 35 will move along the length of the spindles 32, 33, thus carrying along the pusher element 7. When the electric motors 38, 39 operate simultaneously, the pusher element 7 will retain the orientation shown in FIG. 3a and thus remain oriented parallel to the conveying direction 3. When one electric motor is actuated with some delay in relation to the other electric motor, the pusher element 7 may assume a certain inclined orientation during its transverse movement.

Figure 4A:
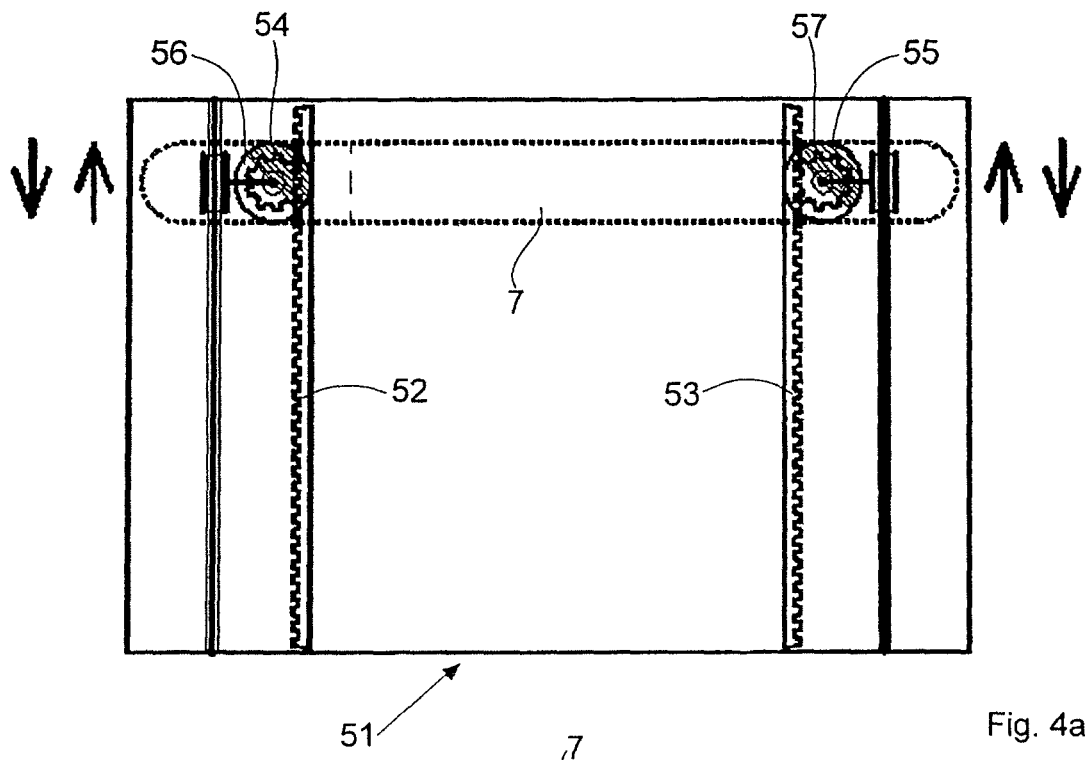
FIGS. 4a-4c schematically show a top plan view, a side view and a front view, respectively, of a portion of a sorting unit forming part of a sorting device of a second embodiment, according to the present disclosure.
Figure 4B:
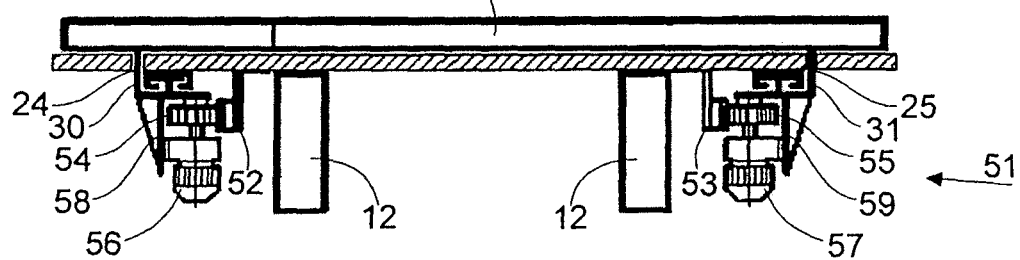
Figure 4C:
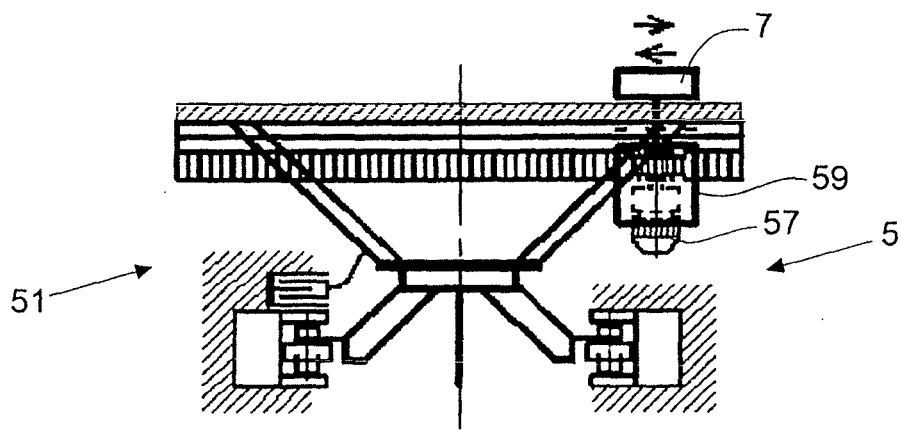

The sorting unit 51 shown in FIGS. 4a-4c comprises two racks 52, 53 facing away from each other, which mesh with pinions 54, 55. The central axes of the pinions 54, 55 are vertically oriented, being in line with the central axis of the outgoing shaft of the electric motors 56, 57. The pinions 54, 55 are rotatably journalled relative to connecting pieces 58, 59, to which also the electric motors 56, 57 are fixedly connected. Activation of the electric motors 56, 57 will result in the pinions 54, 55 rolling along the racks 52, 53 together with the electric motors 56, 57 themselves on the one hand and the pusher element 7 on the other hand.

Alternatively, the sorting unit 51, according to the present disclosure, might also have only one electric motor, for example the electric motor 56, which would directly drive one pinion 54 while driving the other opinion 55 via a transmission, such as a sprocket-chain-sprocket transmission. The rack 53 would, in that case, be the mirror image of the rack 53 shown in FIG. 4a. However, the pinions 54, 55 would move in the same transverse direction upon actuation of the electric motor 56, thus carrying along the pusher element 7 in that direction.

Figure 5A:
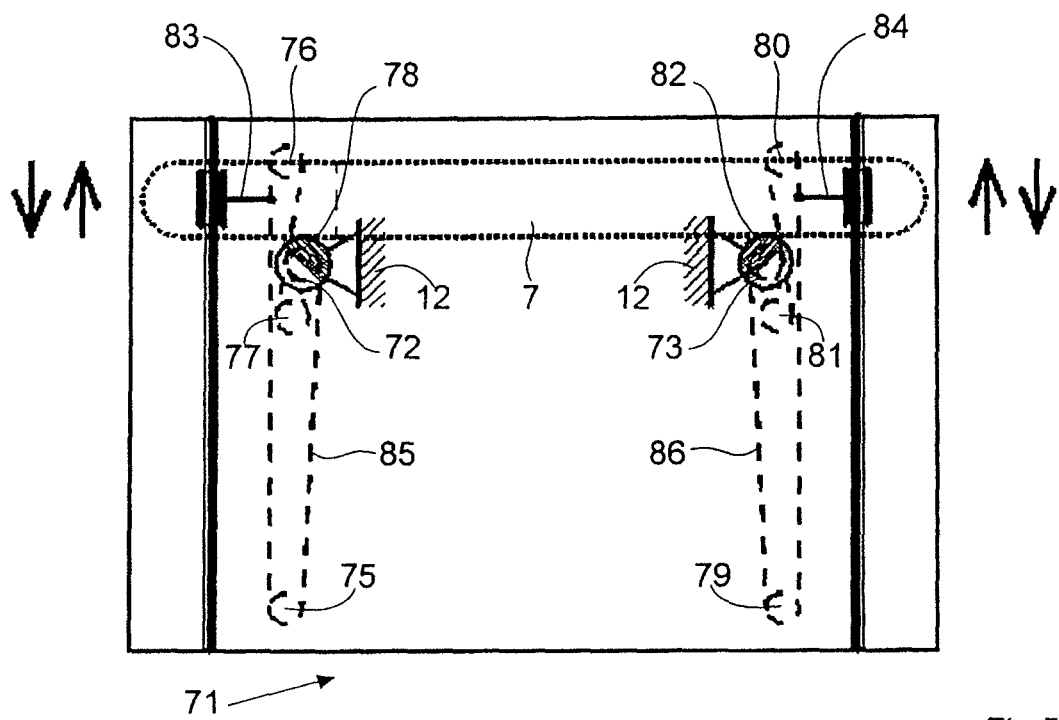
FIGS. 5a-5c schematically show a top plan view, a side view and a front view, respectively, of a portion of a sorting unit forming part of a sorting device of a third embodiment, according to the present disclosure.
Figure 5B:
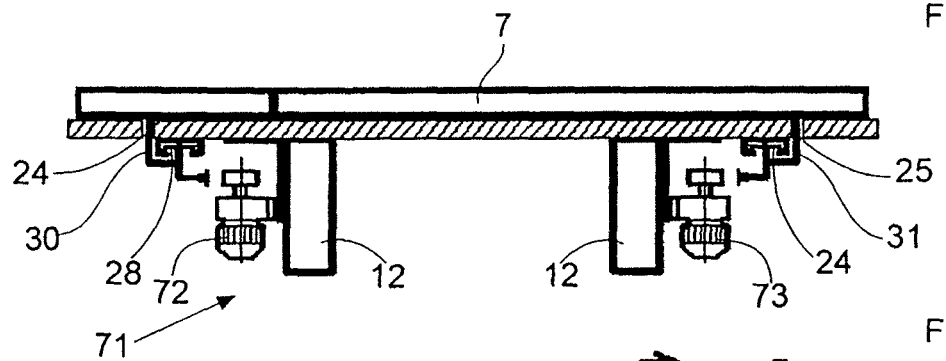
Figure 5C:
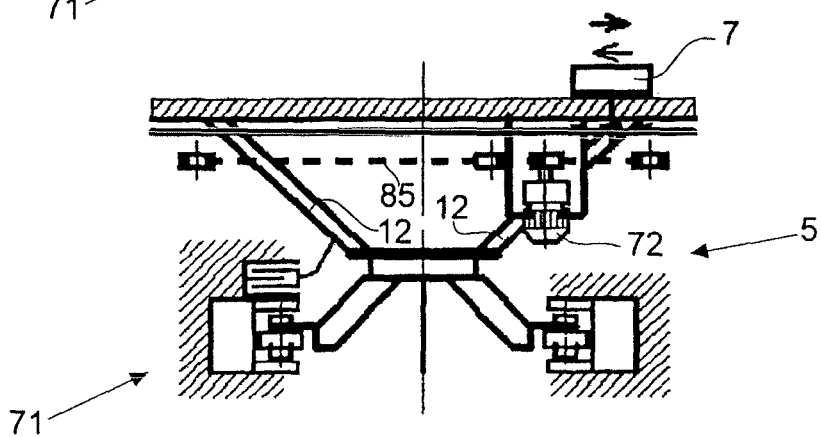
Figure 6A:
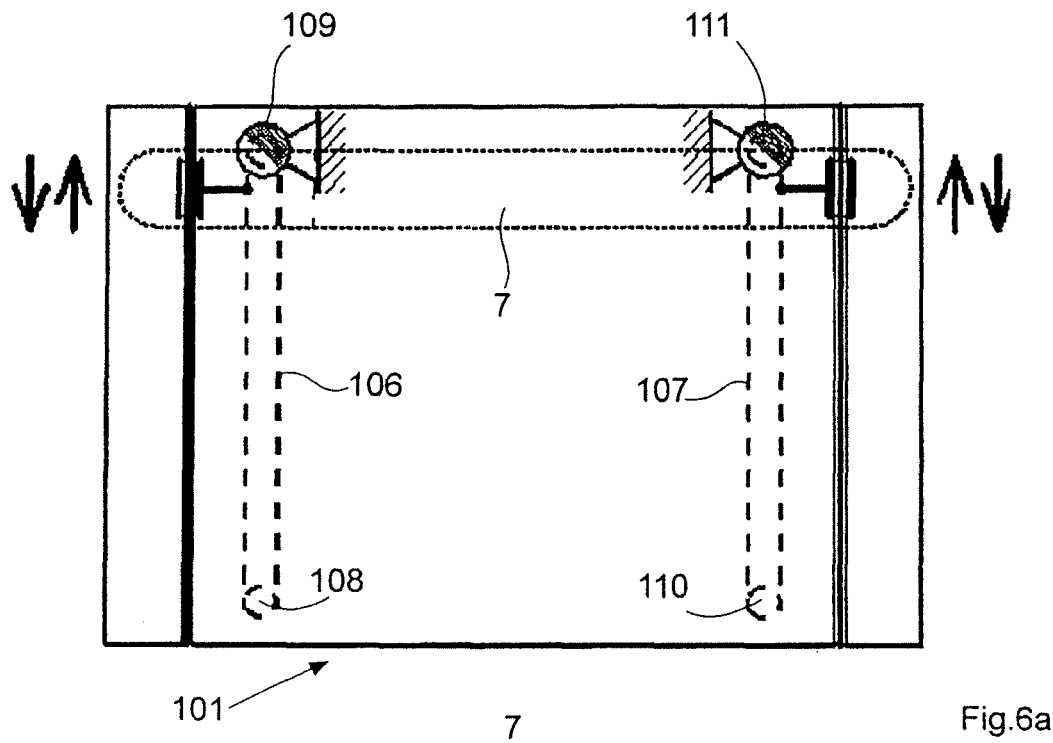
FIGS. 6a-6c schematically show a top plan view, a side view and a front view, respectively, of a portion of a sorting unit forming part of a sorting device of a fourth embodiment, according to the present disclosure.
Figure 6B:
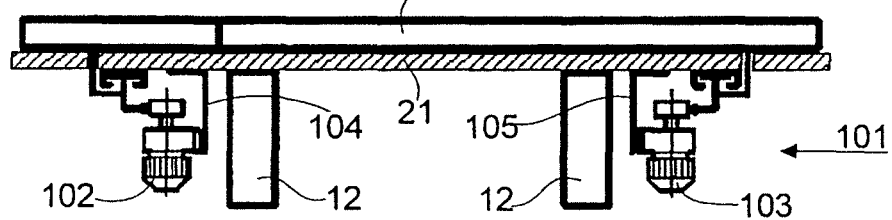
Figure 6C:
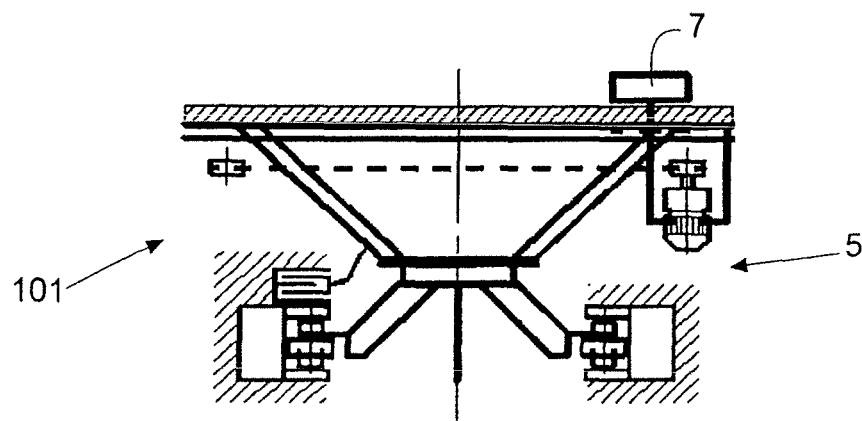

The sorting unit 71 shown in FIGS. 5a-5c, forms part of a third embodiment of the sorting device, according to the present disclosure. Sorting unit 71, comprises electric motors 72, 73, which are each rigidly connected to a support arm 12. Furthermore, two flexible transmission elements 85, 86 are provided, which may, for example, be configured as a drive belt or a drive chain, and which are passed over four pulley means 75-78 and 79-82. The central axes of the pulley means 78, 82 are in line with the central axes of the electric motors 72, 73. The part of the flexible transmission element 85, 86 that extends between the pulley means 75, 76 and 79, 80 is connected to guide members 28, 29 via connecting pieces 83, 84, and to the pusher element 7 via connecting pieces 30, 31. Actuation of the electric motors 72, 73 will cause the pusher element 7 to be moved in a transverse direction. The use of, two times, four pulley means 75-78 and 79-82 makes it possible to move the pusher element forward and backward in a transverse direction across the entire width of the carrier blade 21.

The sorting unit 101 that forms part of a fourth embodiment of a sorting device, according to the present disclosure, is quite similar to the third embodiment shown in FIGS. 5a-5c and is of even slightly simpler construction. The electric motors 102, 103 are rigidly connected to the bottom side of the carrier blade 21 via connecting pieces 104, 105. The flexible transmission elements 106, 107 are passed over pulley means 108, 109 and 110, 111, of which the pulley means 109 and 111 are directly driven by the electric motors 102, 103. Actuation of the electric motors 102, 103 will result in the pusher element 7 being moved sideways.

Figure 7A:
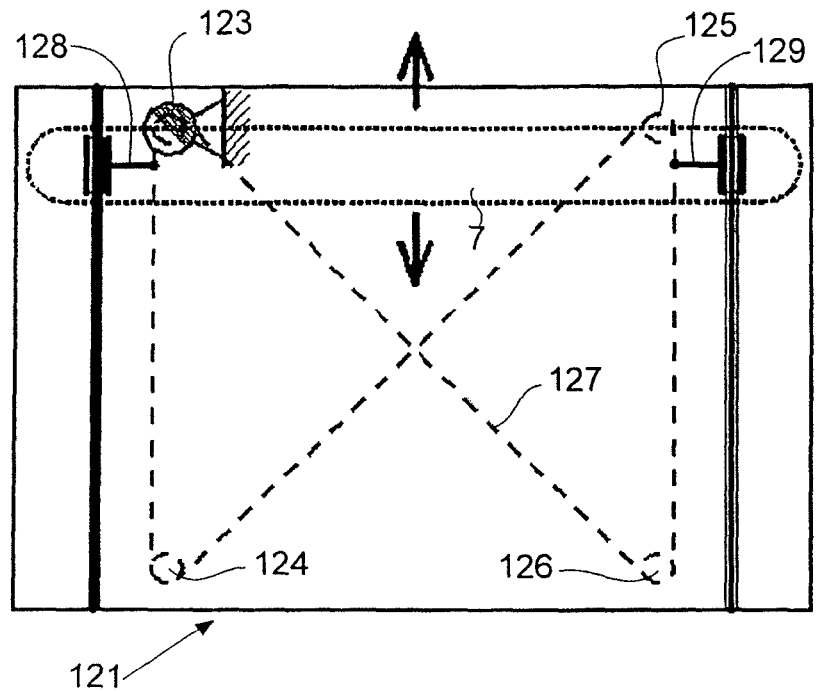
FIGS. 7a-7c schematically show a top plan view, a side view and a front view, respectively, of a portion of a sorting unit forming part of a sorting device of a fifth embodiment, according to the present disclosure.
Figure 7B:
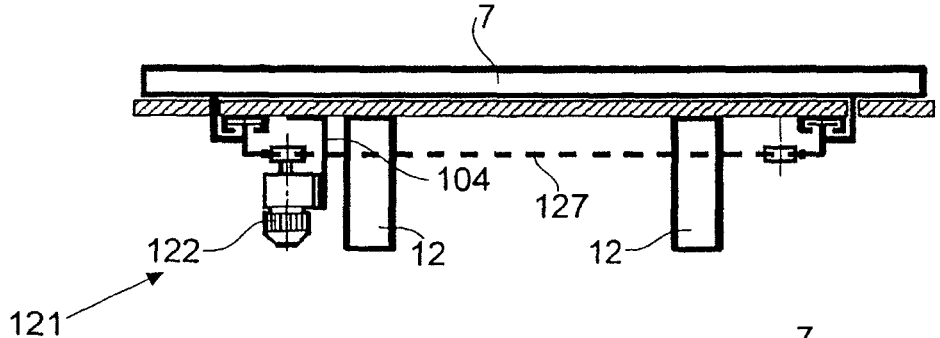
Figure 7C:
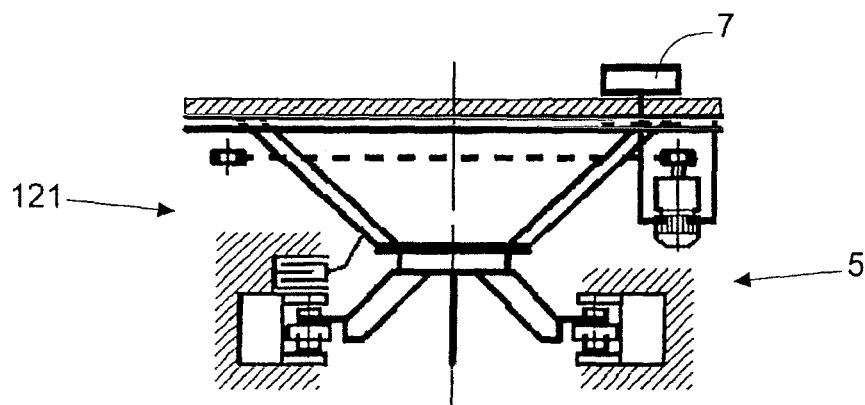

In a sorting device according to a fifth embodiment, of which the sorting units 121 shown in FIGS. 7a-7c form part, the use of only one electric motor suffices. Said electric motor 122 drives one of four pulley means 123-126, over which a flexible transmission element 127 is passed crosswise. As a result of the crosswise form, the parts of the flexible transmission element 127 between the pulley means 123 and 124, on the one hand, and the pulley means 125 and 126, on the other hand, will move in the same direction. The parts in question are connected to two ends of the pusher element 7 by connecting pieces 128, 129. Actuation of the electric motor 122 will result in the pusher element 7 being moved along the carrier blades 21 in a direction transversely to the conveying direction.

Figure 8A:
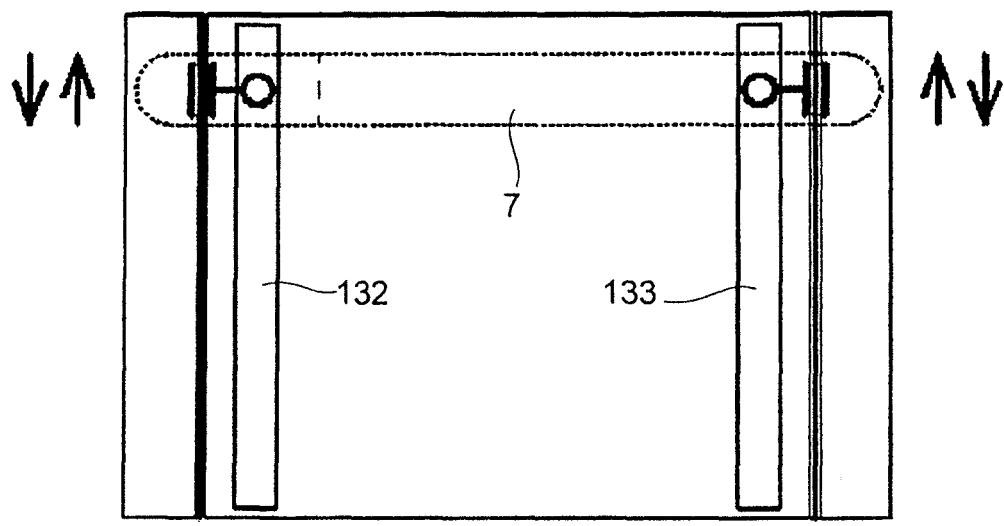
FIGS. 8a-8c schematically show a top plan view, a side view and a front view, respectively, of a portion of a sorting unit forming part of a sorting device of a sixth embodiment, according to the present disclosure.
Figure 8B:
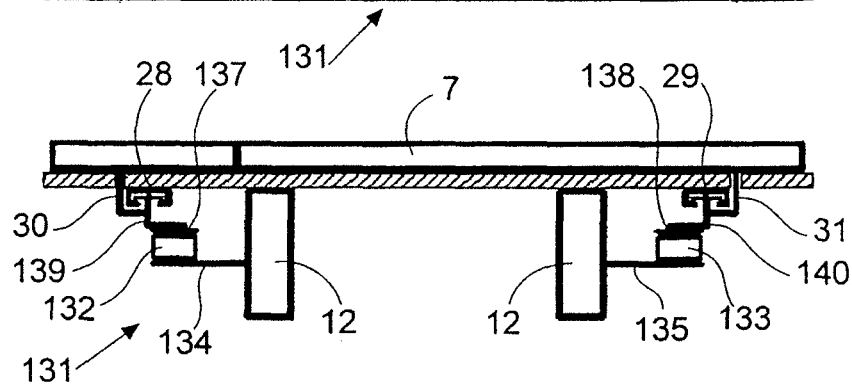
Figure 8C:
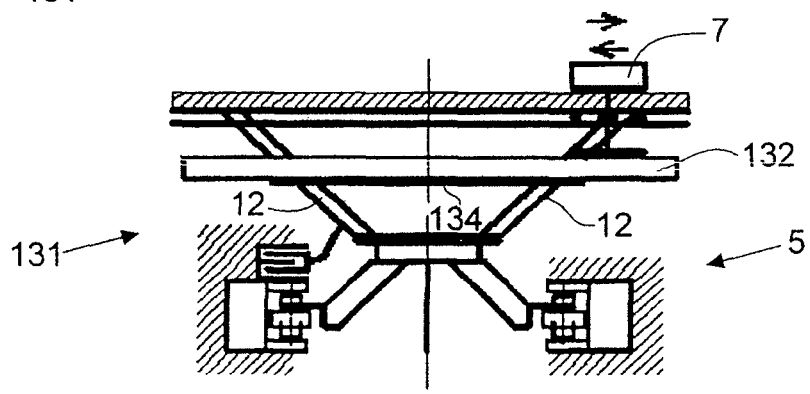

In a sixth embodiment of a sorting device, according to the present disclosure, of which the sorting units 131 shown in FIGS. 8a-8c form part, electric motors of the linear induction type, referred to herein as LIM motors, are used for driving the pusher elements 7. Two such motors are provided, that is, LIM motors 132, 133. The LIM motors 132, 133 are mounted to connecting pieces 134, 135, which are attached to support arms 12. Reaction members 137, 138 coact with the LIM motors 132, 133. Said reaction members 137, 138 are connected to guide members 28, 29 via connecting pieces 139, 140 and to the associated pusher element 7 via connecting pieces 30, 31. Upon suitable actuation of the LIM motors 132, 133, the reaction members 137, 138 will move along the length of the LIM motors 132, 133, thus carrying along the pusher element 7.

Figure 9A:
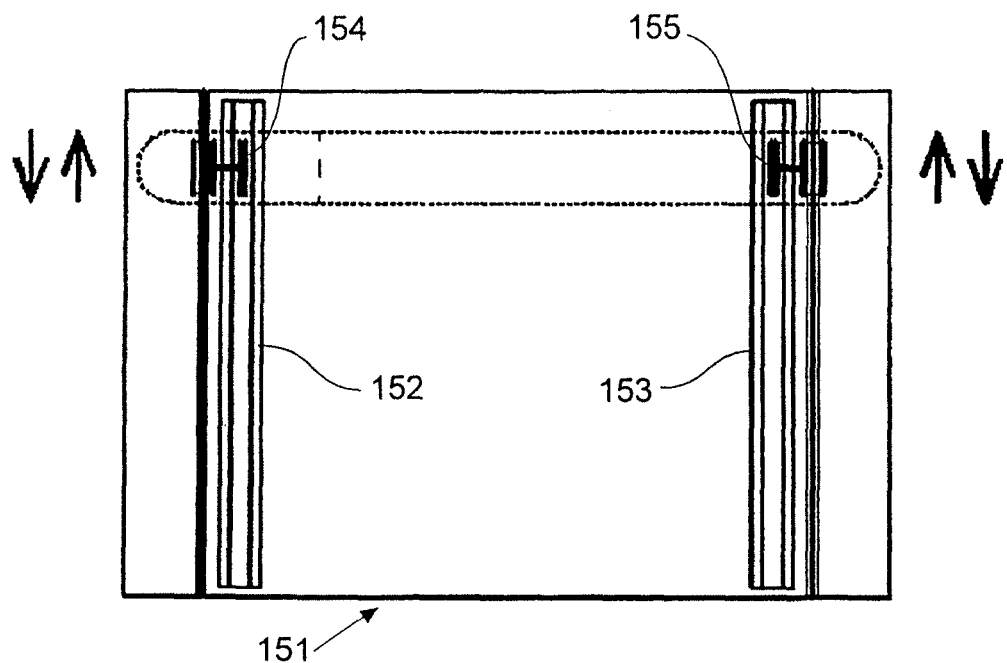
FIGS. 9a-9c schematically show a top plan view, a side view and a front view, respectively, of a portion of a sorting unit forming part of a sorting device of a seventh embodiment, according to the present disclosure.
Figure 9B:
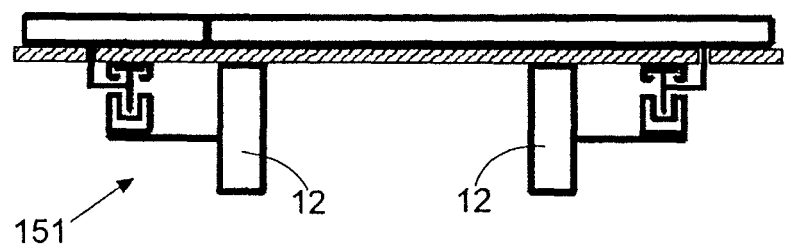
Figure 9C:
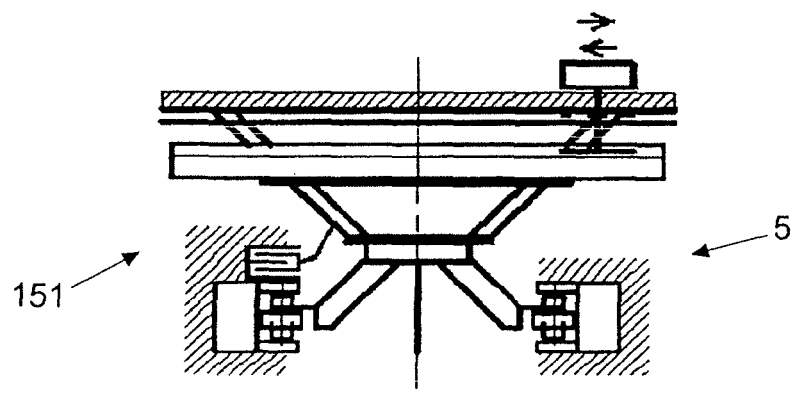

The sorting unit 151 shown in FIGS. 9a-9c, which forms part of a sorting device according to a seventh embodiment, according to the present disclosure, in essence only differs from the sorting unit 131 as regards the LIM motors 152, 153 thereof and of the associated reaction members 154, 155. The LIM motors 152, 153 are U-shaped, with the open side facing upwards, while the reaction members 154, 155 are vertically oriented and extend at least partially within the leg of the U-shape of the associated LIM motors. In this way an efficient transfer of energy can take place.

FIGS. 10a and 10b relate to an eighth embodiment of the sorting device. The sorting units 161 thereof do not comprise a driving motor for each sorting unit for effecting the transverse movement of the pusher element 7. Instead, four LIM motors 162-165 are used. The LIM motors 162-165 are oriented at an angle relative to the conveying direction and are fixedly connected to the fixed world, for example by guides 4. The LIM motors 162 and 163 and also the LIM motors 164 and 165 are in line with each other, with an opening 166, 167 being present between the respective LIM motors. The LIM motors 162, 163, on the one hand, and the LIM motors 164, 165, on the other hand, extend parallel to each other. Provided directly below the gaps 24, 25, albeit shown beside the gaps in FIG. 10b, unlike the actual situation, for the sake of clarity, are reaction members 168, 169. Via the connecting pieces 170, 171, the reaction members 168, 169 are directly connected. That is, they are connected, without use being made of an intermediate transmission, to the pusher element 7. The connecting pieces 170, 171 are guided within the guides 172, 173, which are fixedly connected to the carrier blade 21. The spacing, seen in the conveying direction 3, between the parallel rows of LIM motors 162, 163 and 164, 165 is the same as the spacing between the reaction members 168, 169.

While the reaction members 168, 169 pass the LIM motors 162, 164, the reaction members 168, 169 will follow the longitudinal direction of the LIM motors 162, 164 upon simultaneous actuation of the LIM motors 162, 164, and subsequently, having passed the openings 166, 167, the reaction members 168, 169 will follow the longitudinal direction of the LIM motors 163, 165, which also need to be suitably actuated for that purpose. The longitudinal direction of the pusher element 7 will continue to extend parallel to the conveying direction. To achieve a controlled situation, it is desirable if the dimensions of the reaction members are selected so that an overlap with one of the LIM motors on either side of the openings 166, 167 is maintained at all times during the passage of the openings 166, 167.

While sorting unit 161 passes the LIM motors, part of the chassis of the sorting unit 161 moves through the openings 166, 167. In the present example, the chassis would have to be configured differently from the chassis described in the foregoing, however. A suitable chassis would essentially have an upside-down Y-shape, seen in cross-section, instead of being substantially X-shaped, like the chassis of the sorting units discussed so far, in which case the vertical leg of the upside-down Y-shape would be the part extending through the openings 166, 167.

Alternatively, is within the scope of the present disclosure to connect the reaction members 168, 169 to the pusher element 7 via a transmission, so that, depending on the transmission ratio, transverse movement of the reaction members 168, 169 will lead to a larger transverse movement of the pusher element 7. Thus, two single, successive LIM motors would suffice, which motors would only extend over a limited part of the width of the carrier blade 21, in that case. The remaining part of the width might, in that case, be utilized for providing space for the chassis to pass the LIM motors in question. The chassis will also have to be configured correspondingly, of course.

Alternatively, it is within the scope of the present disclosure to actuate only one of the parallel rows of LIM motors 162, 163 or 164, 165, or to provide only one such row. Actuation of the LIM motors in question will result in the two reaction members 168, 169 following the longitudinal direction of the LIM motors, as a result of which the pusher element 7 will take up an inclined orientation.

Figure 11:
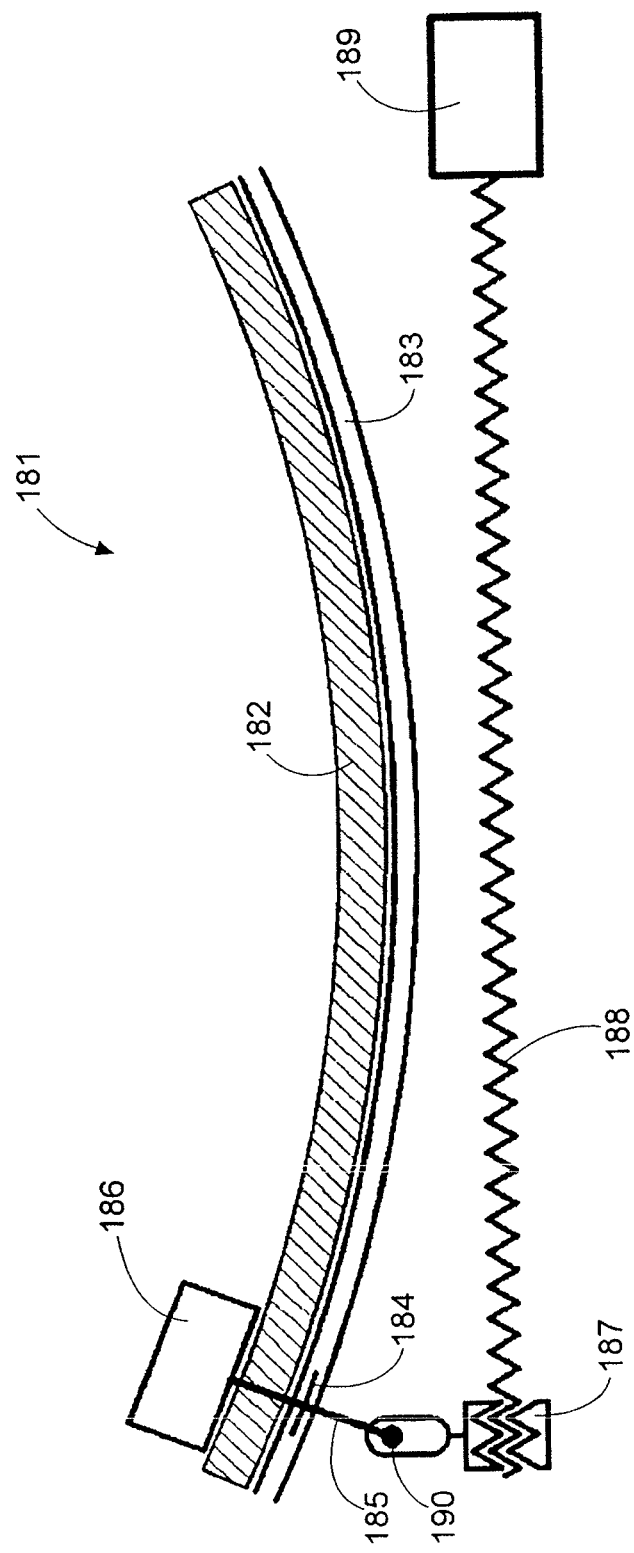
FIG. 11 schematically shows, in a vertical cross-sectional view, of a portion of a sorting unit forming part of a sorting device of a ninth embodiment, according to the present disclosure.

FIG. 11 shows a ninth embodiment of a sorting device according to the present disclosure, at least schematically, and only insofar as relevant, a sorting unit 181 thereof. The sorting unit 181 comprises a cup-shaped carrier blade 182 and directly therebelow a curved guide 183. The guide 183 guides a guide member 184, which is, on the one hand, rigidly connected to the pusher element 186, which extends above the carrier blade 182, and which is, on the other hand, connected to the spindle nut 187, which is arranged to mate with the spindle 188, and which is driven by the electric motor 189 that forms part of the sorting unit 181. The connection 190 between the spindle nut 187 and the connecting piece 185 allows the connecting piece 185 to pivot relative to the spindle nut 187 about a pivot axis that extends parallel to the direction of movement. In this way, the spindle 188 can have a rectilinear configuration, while the guide 183 is curvilinear. It is within the scope of the present disclosure that other transmission types, for example transmissions as discussed herein, could be used as variants in this ninth embodiment.

In the above embodiments of the present disclosure, as discussed with reference to FIGS. 1-11, an endless train of sorting units is used. It is important to note, however, that it is also possible, within the scope of the present disclosure to use a finite train of sorting units, in which case only the front sorting unit is provided with drive means for moving the train along a conveying path, or a traction carriage is provided at the front side of the finite train.

Figure 12:
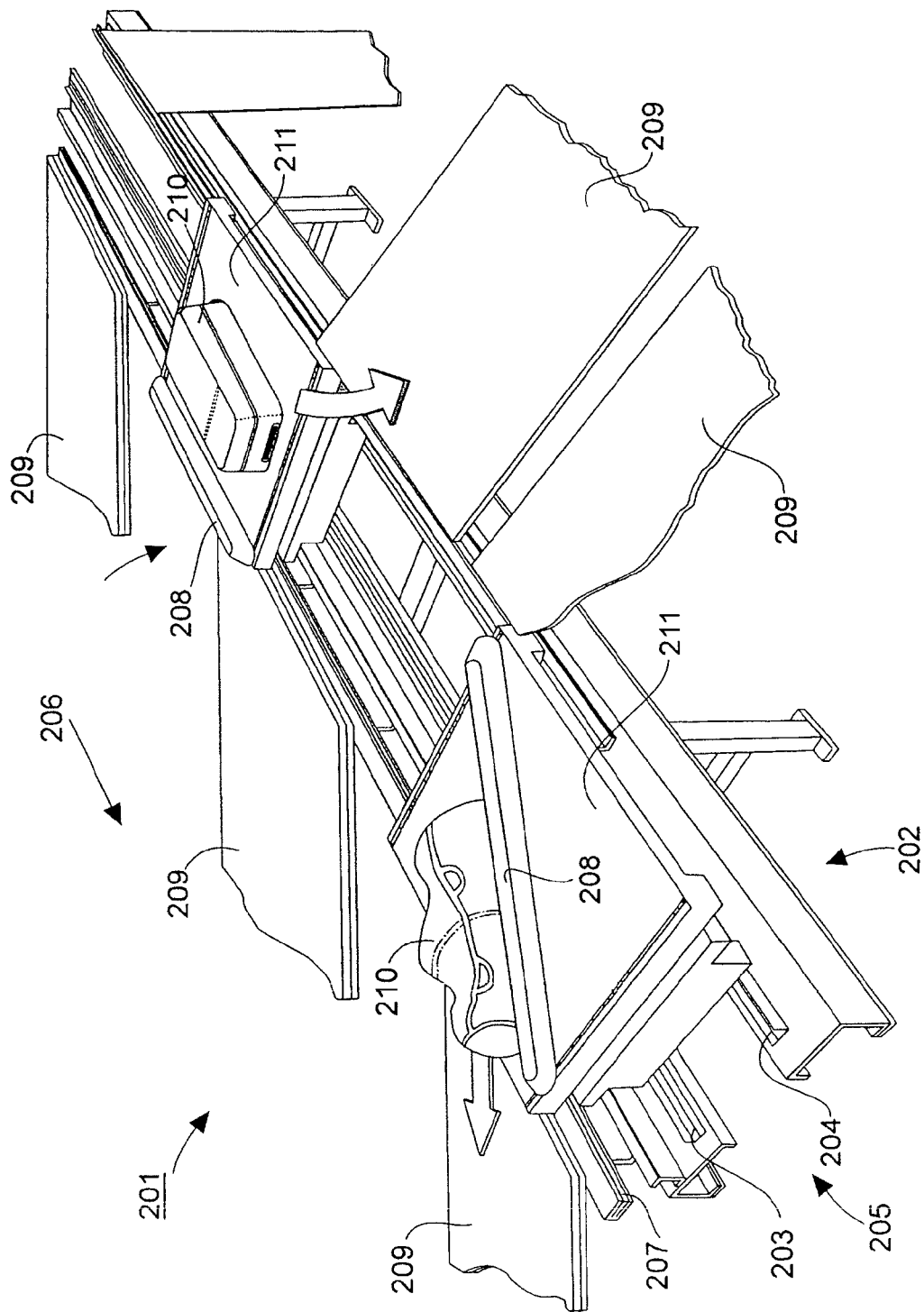
FIG. 12 schematically shows a perspective view part of another embodiment of a sorting device, according to the present disclosure.
Figure 13A:
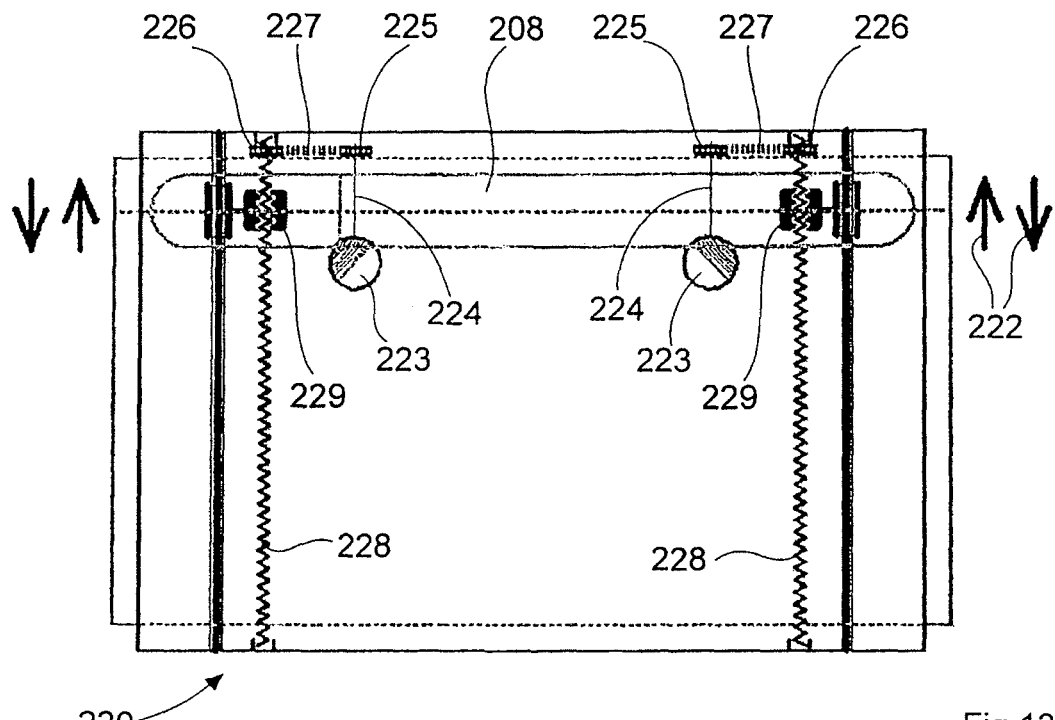
FIGS. 13a-13c schematically show a top plan view, a side view and a front view, respectively, of a portion of a sorting unit forming part of a sorting device of a tenth embodiment, according to the present disclosure.
Figure 13B:
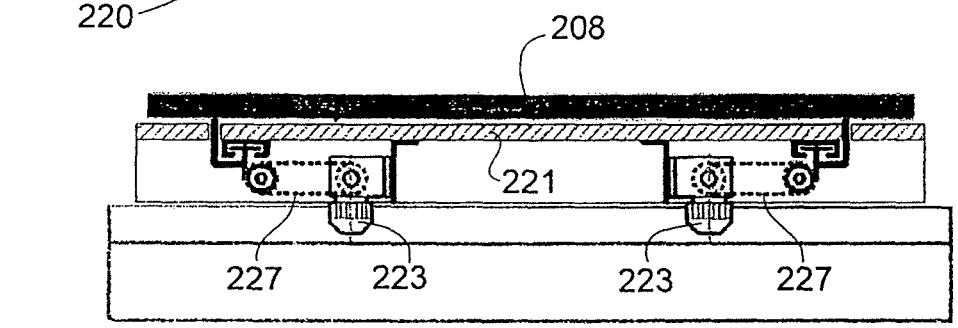
Figure 13C:
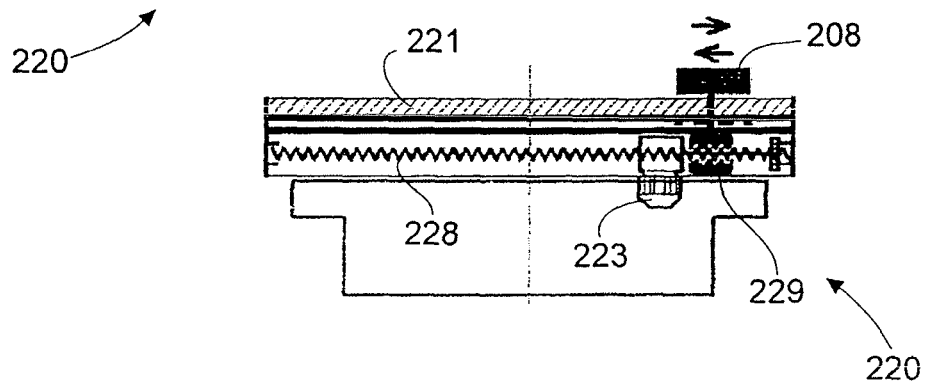
Figure 14A:
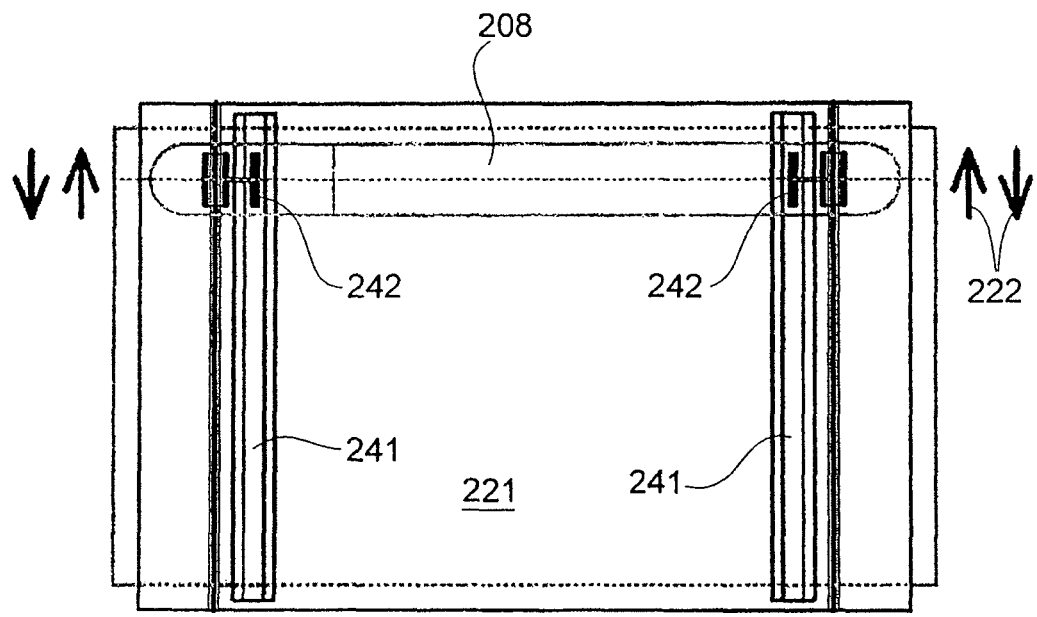
FIGS. 14a-14c schematically show a top plan view, a side view and a front view, respectively, of a portion of a sorting unit forming part of a sorting device of an eleventh embodiment, according to the present disclosure.
Figure 14B:
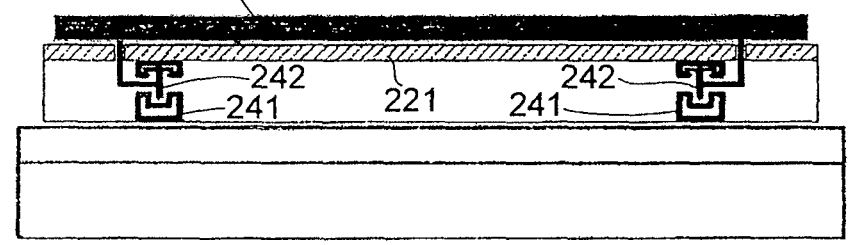
Figure 14C:
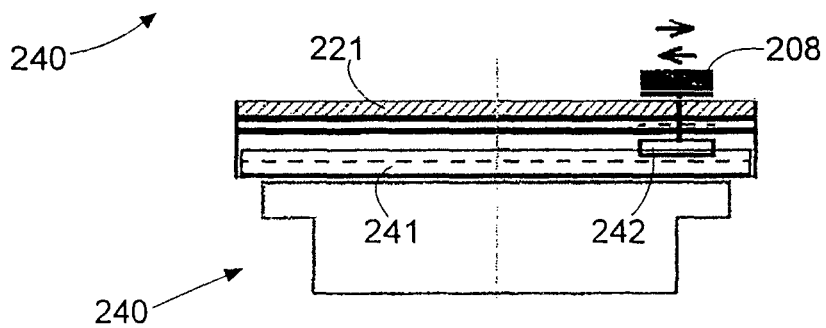

It is furthermore possible, within the scope of the present disclosure, not to interconnect the sorting units. FIG. 12 shows an example of a part of such a sorting device 201. The sorting device 201 comprises individual sorting units 202, which are supported on parallel belts 203, 204 of a double belt conveyor 205, which conveys the sorting unit 202 in the conveying direction 206. A conductor rail 207 is provided on one longitudinal side of the conveyor 205 for transferring electric energy to a sorting unit 202 for actuating one or two electric motors forming part of the sorting unit 202. By the electric motors, the pusher elements 208, which likewise form part of a sorting unit 202, can be moved in a transverse direction, in an inclined orientation or in a straight orientation, for pushing a product to be sorted, such as, for example, a piece of luggage 201, off the carrier blade 211 of the sorting unit 202. The use of the individual sorting units 202 has an advantage that the units can be readily removed from the conveyor 205, for example at the location of a junction where the conductor rail 207 is interrupted. In this way a greater flexibility is obtained as regards the conveying path followed by each of the sorting units.

Examples of sorting units 202 and how they might be configured, are shown as sorting units 220 and 240 of a tenth embodiment and an eleventh embodiment, respectively, of a sorting device according to the present disclosure.

The sorting device 220 comprises a carrier blade 221, above which the pusher element 208 is movable in a transverse direction, as indicated by the arrows 222. Moving means are provided for that purpose, which moving means comprise two electric motors 223 having outgoing shafts 224, which are fixedly disposed within the sorting unit 220. The moving means further comprise a transmission provided with sprockets 225, 226 and a chain 227. The sprockets 226 are connected to spindles 228, so that actuation of the electric motors 223 will result in the spindle nuts 229, which are connected to the pusher element 208 in a manner already described before, being moved in either one of the two transverse directions 222.

To drive the pusher element 208, the sorting unit 240 employs LIM motors fixedly disposed within the sorting unit 240, which mate with reaction members 242 connected to the pusher element 208 as already explained in the description of the sorting unit 151 shown in FIGS. 9a-9c.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A sorting device for sorting products the sorting device comprising at least one sorting unit movable in a conveying direction along a conveying path, each sorting unit comprising:

a carrier to support the products to be sorted;
an elongated pusher element disposed above the carrier;

moving means for moving the elongated pusher element sideways with respect to the carrier at a sorting location;

guide means for guiding the sideways movement of the elongated pusher element, the guide means including at least one guide fixedly disposed relative to the carrier and at least one guide member connected to the elongated pusher element and movable along the at least one fixed guide; and wherein the moving means includes at least one driving motor to effect the sideways movement of the elongated pusher element relative to the carrier and the guide means includes two fixed guides and two guide members movable along the at least one fixed guide.

2. The sorting device according to claim 1, wherein the moving means including two driving motors for the sorting unit for effecting the sideways movement of the elongated pusher element relative to the carrier.

3. The sorting device according to claim 2, wherein the two driving motors move the elongated pusher element sideways via the two guide members.

4. The sorting device according to claim 1, wherein the two fixed guides are provided near two opposite ends of the elongated pusher element.

5. The sorting device according to claim 1, wherein the two guide members are pivotally connected, about respective vertical axes, to the elongated pusher element and the elongated pusher element has a variable length.

6. The sorting device according to claim 1, wherein the moving means includes mechanical transmission means which act between the at least one driving motor and the elongated pusher element.

7. The sorting device according to claim 6, wherein the transmission means includes at least one meshing rack-and-pinion combination, the rack being fixedly connected to the carrier and the pinion having a central axis.

8. The sorting device according to claim 7, wherein an outgoing shaft of the at least one driving motor is in line with the central axis of the pinion.

9. The sorting device according to claim 6, wherein the transmission means includes a flexible transmission element which is passed over at least two pulley means which are fixedly connected to the carrier, which at least two pulley means each have a central axis.

10. The sorting device according to claim 9, wherein the transmission means comprise two meshing rack-and-pinion combinations, and in that the at least two pulley means are connected to the two pinions for joint rotation, the central axes of the at least two pulley means coincide with the central axes of the two pinions of the two meshing rack-and-pinion combinations.

11. The sorting device according to claim 6, wherein the transmission means comprise a spindle-spindle nut combination.

12. The sorting device according to claim 1, wherein the at least one driving motor is a linear induction motor (LIM), and the moving means further comprise a reaction member for driving cooperation with the LIM driving motor.

13. The sorting device according to claim 1, further comprising a plurality of sorting units and the plurality of sorting units are detached from each other.

14. The sorting device according to claim 1, wherein the elongated pusher element has a length of at least 50 cm.

15. The sorting device according to claim 1, wherein the moving means includes mechanical transmission means which act between the at least one driving motor and the at least one guide member.

16. The sorting device according to claim 1, wherein the elongated pusher element has a length of at least 80 cm.

17. A sorting device for sorting products, the sorting device comprising at least one sorting unit movable in a conveying direction along a conveying path, each sorting unit comprising:

a carrier to support the products to be sorted;

an elongated pusher element disposed above the carrier;

moving means for moving the elongated pusher element sideways with respect to the carrier at a sorting location;

guide means for guiding the sideways movement of the elongated pusher element, the guide means including at least one guide fixedly disposed relative to the carrier and at least one guide member connected to the elongated pusher element movable along the at least one fixed guide; and wherein the moving means includes at least one linear induction driving motor disposed at the sorting location and a reaction member associated with the sorting unit configured for driving cooperation with the linear induction driving motor upon passage of the sorting location by the sorting unit to effect the sideways movement of the elongated pusher element relative to the carrier, the at least one linear induction driving motor being fixedly disposed at the sorting location with a longitudinal length of the at least one linear induction driving motor disposed at an angle relative to the conveying direction, such that while the sorting unit passes the at least one linear induction driving motor, the reaction member follows the longitudinal length of the at least one linear induction driving motor upon actuation of the at least one linear induction driving motor.

* * * * *